United States Patent [19]
Moughanni et al.

[11] Patent Number: 5,734,844
[45] Date of Patent: Mar. 31, 1998

[54] BIDIRECTIONAL SINGLE-LINE HANDSHAKE WITH BOTH DEVICES DRIVING THE LINE IN THE SAME STATE FOR HAND-OFF

[75] Inventors: Claude Moughanni; Mark W. McDermott, both of Austin, Tex.

[73] Assignee: Cyrix Corporation, Richardson, Tex.

[21] Appl. No.: 602,176

[22] Filed: Feb. 16, 1996

Related U.S. Application Data

[63] Continuation of Ser. No. 133,721, Oct. 8, 1993, abandoned.

[51] Int. Cl.$^6$ .................... G06F 13/24; G06F 13/42
[52] U.S. Cl. .................... 395/287; 395/733; 395/285
[58] Field of Search .................... 395/733–737, 395/868, 800, 285, 287

[56] References Cited

U.S. PATENT DOCUMENTS

| | | | |
|---|---|---|---|
| 4,381,542 | 4/1983 | Binder et al. | 395/737 |
| 4,433,379 | 2/1984 | Schenk et al. | 395/325 |
| 4,631,670 | 12/1986 | Bradley et al. | 395/725 |
| 4,669,057 | 5/1987 | Clark, Jr. et al. | 395/725 |
| 4,769,768 | 9/1988 | Bomba et al. | 395/725 |
| 4,897,810 | 1/1990 | Nix | 395/725 |
| 5,276,888 | 1/1994 | Kardach et al. | 395/725 |
| 5,367,689 | 11/1994 | Mayer et al. | 395/725 |
| 5,410,710 | 4/1995 | Sarangdhar et al. | 395/725 |
| 5,495,615 | 2/1996 | Nizar et al. | 395/733 |
| 5,548,762 | 8/1996 | Creedon et al. | 395/733 |

*Primary Examiner*—Gopal C. Ray
*Attorney, Agent, or Firm*—Andrew S. Viger; John L. Maxin

[57] ABSTRACT

Bidirectional handshake protocol circuitry is provided for asserting and deasserting a signal across a single line between a first device and a second device. Only the first device is permitted to assert the signal on the single line; and only the second device is permitted to deassert the signal on the single line. The protocol is particularly useful between a chipset and a CPU where the chipset asserts a System Management Interrupt (SMI) and the CPU deasserts the interrupt to signal to the chipset that the service routine is complete. After assertion (or deassertion), there is an overlap or hand-off period whereby the single line is driven in the same direction by both devices. After a predetermined number of clock cycles, the device which asserted or deasserted the signal is tristated to await deassertion or assertion, respectively.

5 Claims, 3 Drawing Sheets

BIDIRECTIONAL SINGLE-LINE HANDSHAKE WITH BOTH DEVICES DRIVING THE LINE IN THE SAME STATE FOR HAND-OFF

The present application is a file wrapper continuation of application Ser. No. 08/133,721, filed Oct. 8, 1993, now abandoned.

FIELD OF THE INVENTION

The invention relates to circuitry for asserting an interrupt to a CPU, and more particularly relates, in one embodiment, to circuitry for interrupts to a CPU from a chipset, in one embodiment, which is bidirectional over a single line and consumes low power.

BACKGROUND OF THE INVENTION

Without limiting the scope of this invention, this background information is provided in the context of a specific problem to which the invention has application. In battery powered, portable computer systems, a System Management Mode (SMM) provides an additional interrupt to the central processing unit (CPU) and a separate address space which can be used for system power management or circuit emulation, such as supervisor mode, virtual machine mode, software transparent emulation of I/O peripherals, or for I/O trapping or other use of SMM address space. SMM is entered using the System Management Interrupt (SMI) which has a higher priority than any other interrupt, in some embodiments. While running in protected SMM address space, the SMI interrupt routine can execute without interfering with the operating system or application programs.

Current implementations of such interrupts include pullup (or pulldown) resistors and two wire systems. In the resistor version, the CPU and the chipset have a single wire between them having a pullup resistor for asserting low signals (or a pulldown resistor for asserting high situations). The CPU is always an input and both the chipset and the CPU can either assert or tristate. The pullup resistor is required to prevent the line from drifting low to cause a false interrupt, since the CPU connection is an input only. However, the pullup resistor is a resistive current path between power and ground whenever the interrupt is asserted (driven low in this example). The use of a pullup resistor is justified because the SMI interrupt is used sparingly and the cost in power consumption is arguably insignificant. However, as the acceptance of system management mode increases and more applications are found to benefit from it, SMI usage will increase and the power cost will increase in magnitude.

In the two wire system, the protocol is straightforward, one pin is used to assert the interrupt from the chipset to the CPU, the other is used by the CPU to indicate completion of the service routine. While a resistor is not required to keep the lines driven at all times, this method has the disadvantages that an extra pin must be used and power is unnecessarily consumed when the devices drive in opposite directions.

SUMMARY OF THE INVENTION

In accordance with the present invention, there is provided, in one embodiment, bidirectional handshake circuitry for asserting and deasserting a signal across a single line between a first device and a second device, which includes circuitry for permitting only the first device to assert the signal on the single line, and circuitry for permitting only the second device to deassert the signal on the single line.

One technical advantage of this circuitry is that it eliminates the need for a pullup (or pulldown) resistor because the line is always driven by either the CPU or the chipset. Consequently, there is no power consumption due to a DC connection to ground. During hand-off of control of the line, the CPU and chipset will be driving the line in the same direction. After the interrupt signal has been asserted by the chipset or deasserted by the CPU, the chipset or CPU tristates to await deassertion or assertion from the other, respectively. Thus, the inventive protocol is truly bidirectional. Further, the protocol can be accomplished over a single pin, eliminating the use of two pins for an interrupt that is relatively seldom used.

DETAILED DESCRIPTION OF THE INVENTION

In this description, protocol refers to a well defined set of rules or specific procedure of events or conditions followed by all devices to accomplish a stated purpose for a given system. The circuitry for implementing the protocol may take the form of any number of implementations, as long as the necessary conditions of the protocol are met. The inventive protocol exists over a single line or wire between two devices of a system. In one embodiment of this invention, the two devices linked by a single wire are a chipset and a CPU. In the case of an SMI interrupt, the chipset is understood to control or have higher priority over the CPU since it may assert an SMI to the CPU. However, it is anticipated that the inventive protocol herein could be used between other devices besides a chipset and a CPU where it is desirable to use a single wire to communicate bidirectionally.

Figure 1:
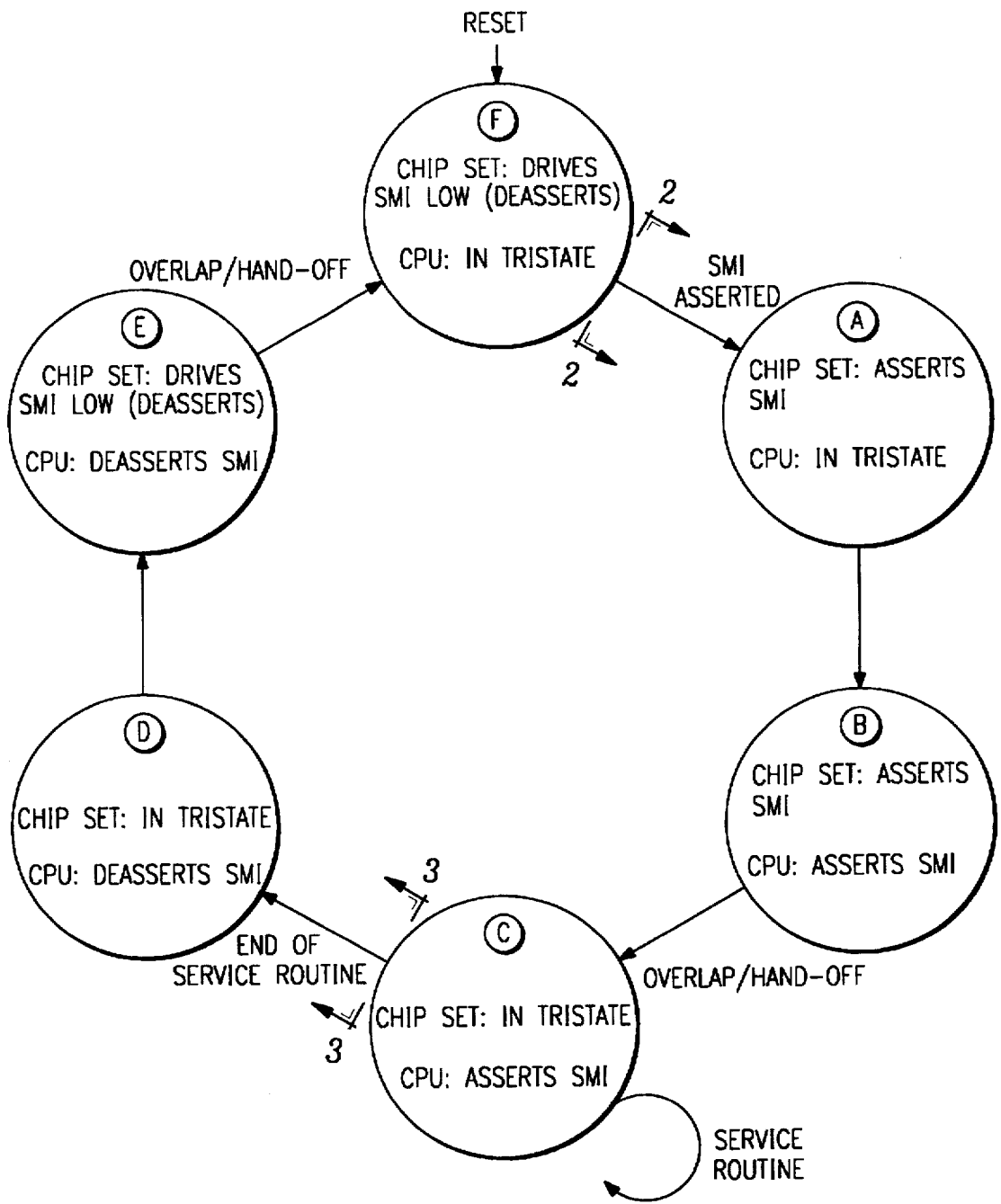
FIG. 1 is a diagram of the various states of the protocol of this invention.
Figure 2:
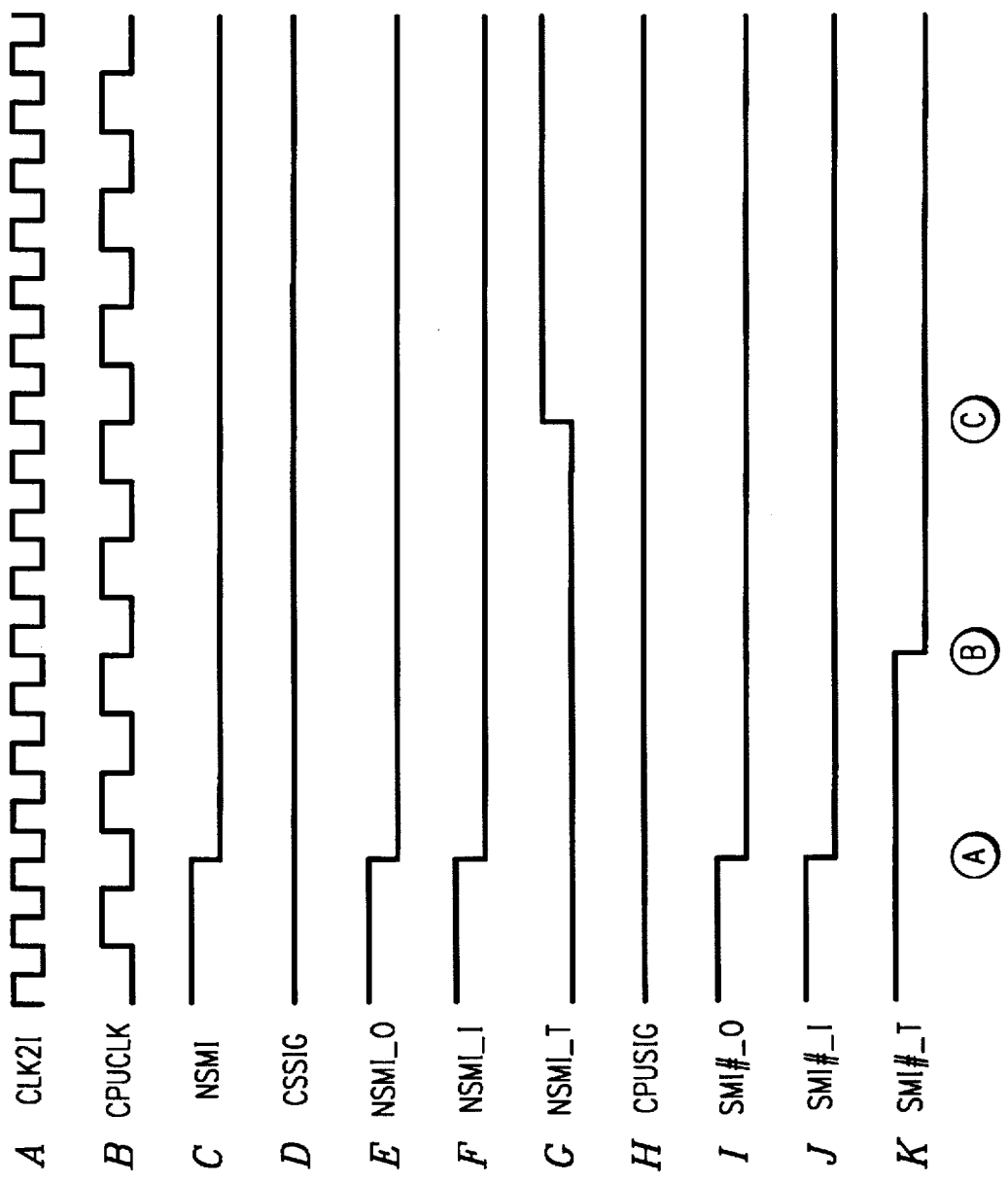
FIG. 2 is a timing diagram of the inventive protocol where an interrupt is asserted as an active low and control of the single line is handed off from the chip set to the CPU, keyed to FIG. 1.

The invention will now be described in more detail with reference to the various Figures which detail the protocol of this invention. It will be appreciated that nsmi is active low (SMI asserted) and when high, SMI is deasserted, in this example. All polarities is arbitrary, however, and may be reversed in any particular implementation. Similarly, the clock cycles shown are arbitrary and may be varied with the particular implementation. FIG. 1 is divided into two halves at 2—2 and 3—3 which are further detailed in timing diagrams FIG. 2 and FIG. 3, respectively and keyed at transitions A–F:

A. SMI is asserted by the system program and the chipset (CSSIG) detects this and asserts it across the single line to the CPU (CPUSIG). Prior to this time, the chipset was driving the single line high; now it asserts it low. The CPU is in receptive tristate at this point. For both the chipset and the CPU, this tristate enable is indicated by the lines suffixed t as high.

B. After a first predetermined number of clock cycles (e.g. four) so that the CPU is ensured that SMI is valid, the CPU switches out of tristate and also drives the single line (SMI pin) low. Between B and C, both the chipset and CPU are driving the line low. This is the overlap or hand-off period.

C. After a second predetermined number of clock cycles (e.g. eight) from the chipset's assertion of SMI, the chipset goes into tristate and no longer drives SMI low. The CPU, however, continues to drive the line low, i.e. takes over the task of asserting SMI. At this point, the CPU goes into SMM (or other mode) and the service (or some other) routine is executed. The chipset understands that the service routine is still underway as long as the CPU has not deasserted SMI.

Figure 3:
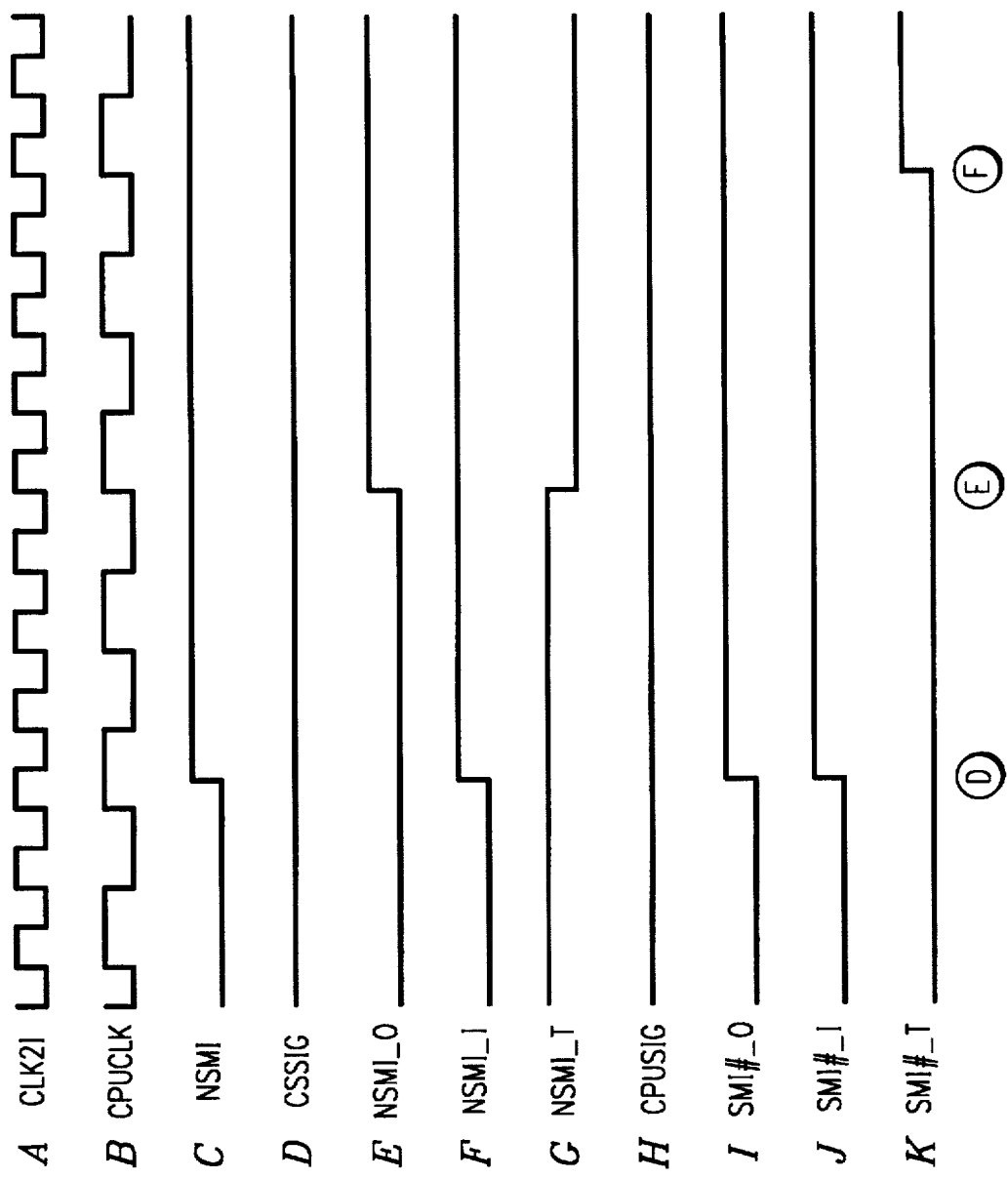
FIG. 3 is a timing diagram of the inventive protocol where an interrupt is deasserted to its inactive high and control of the single line is handed off from the CPU to the chip set, keyed to FIG. 1.

D. Referring to FIG. 3, once the service routine is complete, SMI is deasserted by the CPU (driven high in this example). The chipset remains in tristate.

E. After a third predetermined number of clock cycles (e.g. four), the chipset also drives the SMI pin high or, more generally, deasserts the interrupt. Between E and F, both the CPU and the chipset are driving the line low. This is the other corresponding overlap or hand-off period.

F. Finally, after a fourth predetermined number of clock cycles from the CPU's deassertion of SMI (e.g. eight), the CPU returns to tristate and the chipset continues to drive SMI high, awaiting the assertion of the next SMI.

Thus, the inventive protocol is bidirectional because it has two symmetrical functions: (1) the chipset (and only the chipset) interrupts the CPU by asserting SMI, and (2) the CPU (and only the CPU) informs the chipset that the service routine has been completed by deasserting SMI. As noted, the chipset additionally deasserts SMI after it has been deasserted by the CPU until the next assertion. Correspondingly, the CPU additionally asserts SMI after it has been asserted by the chipset and until the service routine has been completed. Consequently, there are two overlap periods (between B and C and again between E and F) where both devices could be driving SMI to the identical logic level simultaneously. This may be termed the "drive-responsibility" hand-off period. Thus, this "make before break" protocol keeps SMI actively driven at all times and eliminates the need for a resistor and also removes the power to ground DC path when SMI is asserted. The single line is never tristated itself.

Also, it should be noted that both devices should not be tristated at the same time. This stipulation can be assured by careful definition of the clock cycles. The lack of any significant overlap between the tristate enable of both devices avoids dissipation from the capacitors through the system.

Many modifications may be made in the protocol of this invention without departing from the spirit and scope of the invention which are defined only in the appended claims. For example, the two linked devices need not be a CPU and a chipset where the chipset sends an interrupt to the CPU, but may be other devices which have a need to communicate bidirectionally with each other and it is desirable to do across a single line.

We claim:

1. A method for a bidirectional handshake protocol for asserting/deasserting an event signal across a single line between a first device and a second device, where in a no-event state the first device is deasserting the event signal and the second device is tristated, comprising the steps:

(a) initiating an event by asserting the event signal at the first device;

(b) asserting the event signal at the second device a first period of time after the event signal is asserted by the first device, such that a first hand-off period is commenced during which the event signal is asserted by both the first device and the second device;

(c) tristating the first device at the end of the first hand-off period, while the second device continues to assert the event signal;

(d) deasserting the event signal at the second device a second period of time after the first hand-off period;

(e) deasserting the event signal at the first device a third period of time after the event signal is deasserted by the second device, such that a second hand-off period is commenced during which the event signal is deasserted by both the first device and the second device; and (f) tristating the second device at the end of the second hand-off period, thereby entering the no-event state in preparation for a next event.

2. The bidirectional handshake protocol of claim 1, wherein the first device is a chipset and the second device is a central processing unit (CPU).

3. The bidirectional handshake protocol of claim 2, wherein the event signal is a system management interrupt.

4. The bidirectional handshake protocol of claim 3, wherein the CPU enters SMM mode when it asserts the system management interrupt signal.

5. The bidirectional handshake protocol of claim 1, wherein (a) the second device asserts the event signal a first predetermined number of clock cycles after the event signal is asserted by the first device;

(b) the first hand-off period lasts for a second predetermined number of clock cycles; and (c) the second hand-off period lasts for a third predetermined number of clock cycles.

* * * * *